United States Patent [19]

Cope

[11] 4,330,937
[45] May 25, 1982

[54] FISH FILLETTING KNIFE

[76] Inventor: James R. Cope, 10500 Cherokee La., Leawood, Kans. 66206

[21] Appl. No.: 172,452

[22] Filed: Jul. 25, 1980

[51] Int. Cl.³ .......................... A22B 5/16; B26B 3/06
[52] U.S. Cl. ...................................... 30/153; 30/255; 17/68
[58] Field of Search ........................ 30/153, 255, 330; 17/68

[56] References Cited

U.S. PATENT DOCUMENTS

| | | | |
|---|---|---|---|
| 229,706 | 7/1880 | Jansen | 30/153 |
| 881,294 | 3/1908 | Billings | 30/153 |
| 2,714,249 | 8/1955 | Clark et al. | 30/153 |

FOREIGN PATENT DOCUMENTS

| | | | |
|---|---|---|---|
| 11072 | 4/1880 | Fed. Rep. of Germany | 30/153 |
| 572946 | 3/1924 | France | 30/153 |

Primary Examiner—Willie G. Abercrombie
Attorney, Agent, or Firm—John A. Hamilton

[57] ABSTRACT

A fish filletting knife consisting of a blade having a pair of extension members each pivoted at one end to the base of the blade, the extension members being movable between one position in which they form a carrying case enclosing the blade in order that it may be carried safely in the pocket or tackle box, and a second position in which they form a handle from which the blade extends in a use position, and a locking device operable to secure the blade rigidly relative to the extension members in either of said positions.

4 Claims, 7 Drawing Figures

FISH FILLETTING KNIFE

This invention relates to new and useful improvements in folding knives, and has particular reference to fish filletting knives.

A primary object of the present invention is the provision of a knife having a blade and a handle portion, the blade being foldable into the handle in a new and novel manner for safety purposes, or extended therefrom in a use position. Generally, this object is accomplished by the provision of a pair of elongated extension members each pivoted at one end to the base end of the blade, and so configured that when pivoted to coextend with the blade they form a case enclosing the blade, and when pivoted oppositely they form a handle for manipulating the blade in the use thereof.

Another object is the provision of a folding knife of the character described including locking means operable to secure the blade and extension members in rigidly fixed relation in both positions. In the use position, any shifting of the blade relative to the handle could represent danger to the user, and in the folded position, such shifting could result in dulling of the blade edge against the case.

Fish filletting knives, due to the relatively long length and extreme sharpness of the blades required therein, represent a particular hazard to users from a safety standpoint. Also, due to the slenderness and flexibility required in the blades of such knives, they are especially subject to damage by rough handling. However, while for these reasons the present invention has been developed especially in connection with filletting knives, it will be readily apparent that the principles of this invention are also applicable to folding knives in general.

Other objects are simplicity and economy of construction, efficiency and dependability of operation, and ease and convenience of use.

With these objects in view, as well as other objects which will appear in the course of the specification, reference will be had to the accompanying drawing wherein.

Figure 1:
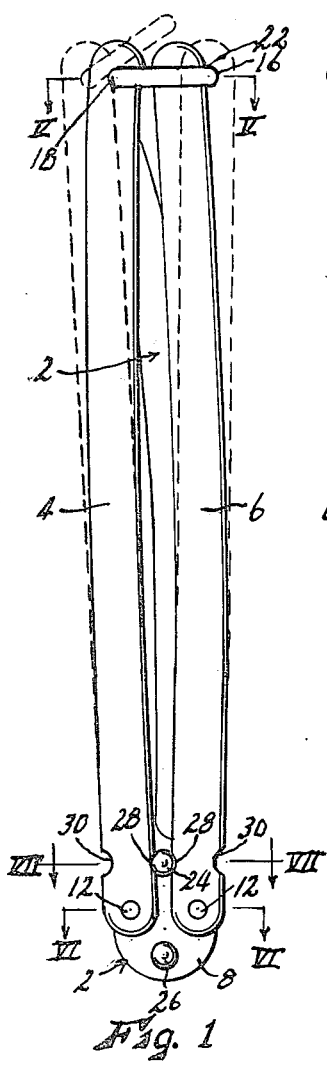
FIG. 1 is a side elevational view of a fish filletting knife embodying the present invention, shown in its folded position, with the position of the extension members just before final locking thereof being shown in dotted lines.

Like reference numerals apply to similar parts throughout the several views. The knife forming the subject matter of the present invention consists principally of a blade 2 and a pair of extension members 4 and 6. Blade 2, in a filletting knife, is generally longer, sharper, more slender and more flexible than in the ordinary pocket knife, and is provided with a base end portion 8 having the same thickness as the blank of which the entire blade is formed. Each of extension members 4 and 6 consists of a length of plastic or other suitable material of about the same length as the blade. They are preferably of rectangular cross-sectional form, such that when laid together they form conjointly a generally square cross-sectional shape the sides of which are greater than the transverse width of blade 2. The square configuration provides a comfortable and secure handgrip when the members are laid together, all longitudinal edges thereof being rounded as shown. They are also formed of a strong but resilient material, such as certain types of plastic or the like.

Figure 2:
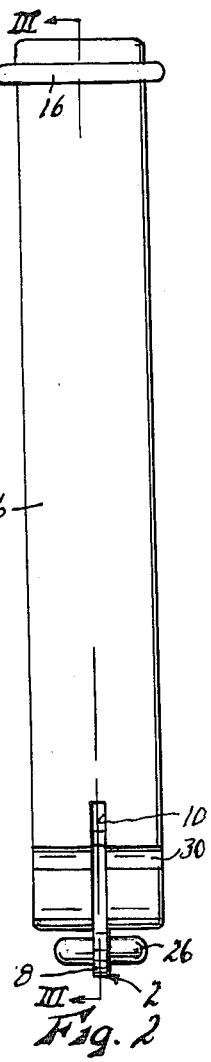
FIG. 2 is an elevational view of the folded knife taken at right angles to that shown in FIG. 1.
Figure 3:
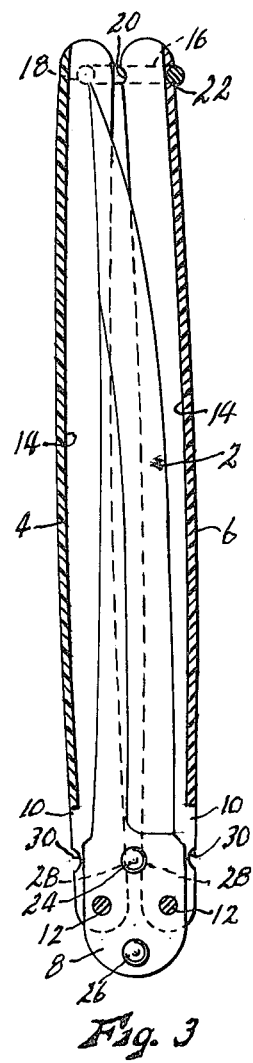
FIG. 3 is a sectional view taken on line III—III of FIG. 2.
Figure 4:
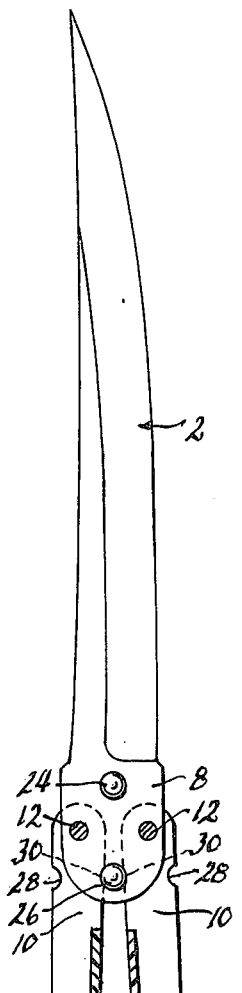
FIG. 4 is a view similar to FIG. 3 but showing the blade extended to its use position.
Figure 5:
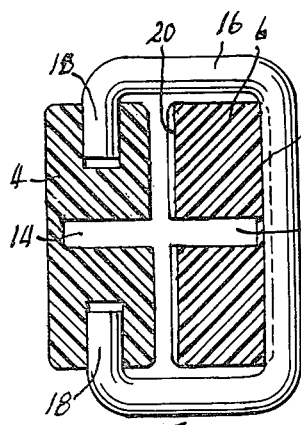
FIG. 5, 6 and 7 are enlarged sectional views taken respectively on line V—V, VI—VI and VII—VII of FIG. 1.
Figure 6:
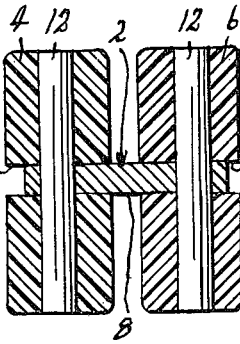
Figure 7:
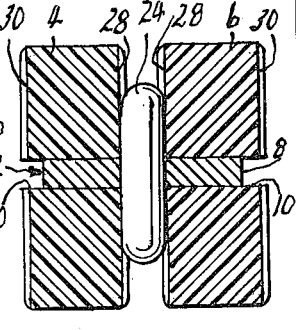

Each of members 4 and 6 is slotted on its minor axis at one end thereof, as indicated at 10, to the thickness of blade base 8, and said blade base is engaged pivotally in both of said slots, each extension member being pivoted to said base, adjacent one end of the former, by a pivot pin 12. Said pivot pins are spaced apart transversely of the longitudinal extent of the blade. Each extension member has a groove 14 formed along the entire length thereof, in alignment with and opening into slot 10 at one end thereof. Thus when said members are pivoted on pins 12 to coextend with blade 2, as shown in FIGS. 1–3, said blade is received in grooves 14, as best shown in FIG. 3, whereby said members form a carrying case protecting and shielding the blade, whereby the knife may be safely carried in a pocket or tackle box without damage to or by the blade. When members 4 and 6 are pivoted oppositely 180 degrees from the FIG. 3 position to the FIG. 4 position, they extend away from the blade, in alignment therewith, to form a handle by which the blade may be manipulated in the intended use thereof. In either of the carrying case or handle positions of members 4 and 6, the ends thereof opposite from pivots 12 may be detachably secured together by a C-shaped bail 16 pivoted at its ends in one of said members as at 18 (see FIG. 5) and frictionally engageable in either of a pair of grooves 20 and 22 formed in the other of said members. In the FIG. 4 position, blade grooves 14 are of course disposed at the distal sides of members 4 and 6, but these grooves are sufficiently narrow, compared to the total width of the members, that they do not interfere with the use of said members as a handgrip.

With the structure and operation thus far described, it will be apparent that members 4 and 6 could still shift longitudinally relative to each other, even when connected together by bail 16, due to the spaced apart relation of pivots 12. This shifting can be damaging in either position of these members. In the use position of FIG. 4, it can permit the blade to pivot to some degree in its own plane about its base end. This insecurity of the blade relative to a handle can be dangerous as well as annoying to the user. In the carrying position of FIGS. 1–3, this pivoting can damage the blade point and cutting edge against members 4 and 6 at the bottoms of grooves 14. To prevent this relative longitudinal movement of members 4 and 6, and the resultant pivoting of the blade, there is provided locking means including a pair of short pins 24 and 26 fixed in blade base 8 normally to the plane thereof and extending in both directions therefrom. Said pins are arranged along the midline of the blade, pin 24 being disposed closer to the point of the blade than pivots 12, and pin 26 farther from the blade point than pivots 12. When the knife is folded as in FIGS. 1–3 pin 24 is engaged in matching rounded grooves 28 formed in the then confronting faces of members 4 and 6. When the knife is in the use position of FIG. 4, pin 26 is engaged in matching rounded grooves 30 formed in the then confronting opposite faces of members 4 and 6. The firm engagement of either pin 24 in grooves 28, or of pin 26 in grooves 30, securely locks members 4 and 6 against relative longitudinal movement, and hence prevents the blade from pivoting relative to members 4 and 6 on pivots 12. Thus in the FIG. 3 configuration the blade point and cutting edge are prevented from ever contacting the bases of grooves 14, and in the FIG. 4 configuration the blade is positioned rigidly relative to the handle.

In order to insure very firm and positive engagement of pins 24 and 26 in grooves 28 and 30, and hence to prevent any "looseness" or "rattling" in the various connections even when the parts become worn, the diameters of said pins are so selected, relative to the spacing between members 4 and 6, that they tend to hold members 4 and 6 in a slightly diverging relation away from pivots 12, as indicated in dotted lines in FIG. 1. Thus, before the opposite ends of said members can be connected together by bail 16, they must be manually forced together, bowing them as permitted by their own resilience. The tension thus applied to said members exerts a strong transverse loading, both to pivots 12 and to the pin 24 or 26 then in use, to take up any looseness or play which may be present. The degree of bowing of members 4 and 6 for this purpose is somewhat exaggerated in the drawing in the interests of clarity. Actually, only a slight degree of bowing is required.

While I have shown and described a specific embodiment of my invention, it will be readily apparent that many minor changes of structure and operation could be made without departing from the spirit of the invention.

What I claim as new and desire to protect by Letters Patent is:

1. A fish filleting knife comprising:
   a. an elongated, generally planar blade,
   b. a pair of elongated extension members each pivoted adjacent one end thereof to the base end of said blade on an axis transverse to itself and normal to the plane of the blade, said axes being spaced apart transversely of the general extent of the blade, said members being pivotally movable between a first position generally coextensive with said blade, the then confronting surfaces of said members each having a groove formed therein for receiving a portion of said blade, whereby said members form a protective cover for said blade, and a second oppositely extending position, wherein said members form a handle for said blade,
   c. a locking pin fixed in said blade adjacent the pivotal axes of said extension members and normal to the plane of the blade, being transversely midway between said axes but spaced further from the point of the blade than said axes, whereby to be confined between said extension members when they are in said second position, and hence to inhibit pivotal movement of said blade relative to said extension members, and
   d. fastener means operable to secure the ends of said extension members opposite their pivoted ends releasably together when the latter are in either said first or said second position, whereby said extension members are caused to grip said locking pin firmly therebetween, said locking pin being operable normally to position said extension members in a relationship diverging away from their pivoted ends, said extension members being formed of resilient material whereby their more widely spaced ends may be manually pressed toward each other for connection by said fastener means, whereby the spring tension of said members applies a multiplied gripping force to the locking pin therebetween.

2. A knife as recited in claim 1 wherein the confronting faces of said extension members, when they are in said second position, have grooves formed therein positioned to mate with and engage opposite sides of said locking pin, whereby said locking pin secures said extension members against relative longitudinal movement.

3. A knife as recited in claim 1 with the addition of a second locking pin fixed in said blade adjacent the pivoted axes of said extension members, and normal to the plane of the blade, being transversely midway between said axes but spaced closer to the point of said blade than said axes, whereby to be confined between said extension members when they are in said first position, said second locking pin being operable normally to maintain said extension members in a diverging relation from their pivoted ends as they approach said first position, the resilience of said extension members permitting their more widely spaced ends to be manually pressed together for connection by said fastener means, whereby said second locking pin is gripped firmly therebetween.

4. A knife as recited in claim 3 wherein the confronting faces of said extension members, when they are in said first position, have grooves formed therein positioned to mate with and engage said second locking pin.

* * * * *